United States Patent
Tatera

(10) Patent No.: US 9,487,743 B2
(45) Date of Patent: *Nov. 8, 2016

(54) METHOD OF MAKING ALCOHOL CONCENTRATE

(71) Applicant: Pat's Backcountry Beverages, Inc., Wheat Ridge, CO (US)

(72) Inventor: Patrick J. Tatera, Wheat Ridge, CO (US)

(73) Assignee: PAT'S BACKCOUNTRY BEVERAGES, INC.

( * ) Notice: Subject to any disclaimer, the term of this patent is extended or adjusted under 35 U.S.C. 154(b) by 99 days.

This patent is subject to a terminal disclaimer.

(21) Appl. No.: 14/532,967

(22) Filed: Nov. 4, 2014

(65) Prior Publication Data

US 2015/0064306 A1 Mar. 5, 2015

Related U.S. Application Data

(63) Continuation of application No. 12/461,583, filed on Aug. 17, 2009, now Pat. No. 8,889,201.

(60) Provisional application No. 61/136,242, filed on Aug. 21, 2008.

(51) Int. Cl.

| | | |
|---|---|---|
| C12C 11/00 | (2006.01) |
| C12C 11/07 | (2006.01) |
| C12C 3/08 | (2006.01) |
| C12C 11/11 | (2006.01) |
| C12G 1/02 | (2006.01) |
| C12G 3/12 | (2006.01) |
| C12C 5/02 | (2006.01) |
| C12C 12/04 | (2006.01) |
| C12G 1/022 | (2006.01) |

(52) U.S. Cl.
CPC .............. *C12C 11/07* (2013.01); *C12C 3/08* (2013.01); *C12C 5/026* (2013.01); *C12C 11/003* (2013.01); *C12C 11/11* (2013.01); *C12C 12/04* (2013.01); *C12G 1/02* (2013.01); *C12G 1/0203* (2013.01); *C12G 3/12* (2013.01)

(58) Field of Classification Search
CPC ....... C12C 3/08; C12C 11/003; C12C 11/07; C12C 11/11; C12C 5/026; C12C 12/04; C12G 1/02; C12G 3/12
USPC ................................ 426/14, 429, 590, 592
See application file for complete search history.

(56) References Cited

U.S. PATENT DOCUMENTS

| | | | |
|---|---|---|---|
| 4,265,920 A | * | 5/1981 | Thijssen ........................ 426/384 |
| 2008/0063749 A1 | * | 3/2008 | Tokuda et al. .................. 426/11 |

* cited by examiner

*Primary Examiner* — Vera Stulii
(74) *Attorney, Agent, or Firm* — Cooley LLP

(57) ABSTRACT

One embodiment of the present invention is a method for making a beverage, such as an alcoholic or non-alcoholic beer, the method comprising performing a first fermentation step using a first set of fermentation ingredients to create a first fermented solution; removing a first collection of alcohol and aromatics from the first fermented solution to create a first de-alcoholized solution; adding a second set of fermentation ingredients to the first de-alcoholized solution; performing a second fermentation step using the second set of fermentation ingredients in the first de-alcoholized solution to create a second fermented solution; creating a beverage, wherein creating the beverage comprises using the second fermented solution and at least a portion of a previous collection of alcohol and aromatics.

18 Claims, No Drawings

METHOD OF MAKING ALCOHOL CONCENTRATE

CROSS REFERENCE TO RELATED APPLICATIONS

This application is a continuation of U.S. application Ser. No. 12/461,583, filed Aug. 17, 2009, now U.S. Pat. No. 8,889,201, entitled Method of Making Alcohol Concentrate, which claims the benefit of U.S. Provisional Application No. 61/136,242, filed Aug. 21, 2008, both of which are incorporated herein by reference in their entireties for all purposes.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to alcoholic beverages, and particularly to a method of making an alcohol concentrate, especially a concentrate of beer, wine, alcohol-base ciders, and the like.

BACKGROUND OF THE INVENTION

Beer has long been a favorite recreational beverage among all classes of people. Beer has traditionally been considered a particularly satisfying beverage after spending long hours laboring or exerting one's self outdoors. There's nothing quite like a cold beer after a long, hard day working outdoors. Although water and energy drinks certainly fulfill one's needs for hydration and nutrition, they don't have the tang of hops or the bite provided by the alcohol in beer. There are some, however, who do not care for beer, but feel the same way towards a glass of wine or alcohol-based cider.

Such beverages, however, have high water content by volume due to the relatively low concentration of alcohol. For the dedicated outdoor sportsman, the high water content of such beverages is a problem because it increases the weight. When going hiking, camping, hunting, etc., the weight one has to carry must be minimized. It is often impractical to carry conventional bottles or cans of beer, wine, or cider on such overnight trips. Moreover, when shipping large volumes of beer, it is desirable to minimize freight charges. Although beer concentrates are known in home brewing, such concentrates are powdered and unfermented, and require considerable time and inconvenience to turn into a potable beverages.

Some breweries have been known to make a beer concentrate to decrease freight charges when shipping beer across the country. At its destination, the concentrate is reconstituted by diluting the concentrate with water to obtain the desired alcohol concentration and adding carbonation, as desired. The beer is then packaged for sale. In such cases, the beer concentrate is prepared by brewing beer with additional ingredients to produce a stronger beer that may be diluted after shipping. However, the beer concentrate itself is not available for sale directly to consumers.

In addition to the benefits of the concentrated beer itself, the process herein described for the production of a beer concentrate has several cost and energy saving benefits over the traditional process of beer production. In conventional beer brewing, a portion of the grain is malted to convert starches in the grain to sugars. The malt and unmalted grains are ground and mixed with hot water in a mash tun to extract the sugars from the grain. The water with the extracted sugars is filtered through a screen to remove most of the spent grain husks, and sprayed or sparged with additional water to remove any additional sugar from the remaining grain, husks, leaving a sweet liquid called the wort. The wort is boiled in a kettle, and hops and other flavor additives are added to the kettle. Boiling removes the bitterness from the hops and sterilizes the wort by killing wild yeast. The wort is cooled and transferred to a fermenter, leaving the spent grain and hops behind.

The wort is brought to a proper temperature (50°-70° F.) to promote fermentation, the wort is aerated or oxygenated, and yeast is pitched or added to the wort either before or after aeration. Fermentation may take place entirely in a single vessel, or in two vessels with repitching of yeast. Primary fermentation lasts about 3-5 days for ales, and longer for lagers. The yeast flocculates and falls to the bottom of the fermenter. At this point, most of the simple sugars and maltose will have been consumed. The fermentation may enter a secondary fermentation, in which the yeast breaks down more complex sugars. Secondary fermentation may last 1-3 days for ales, but up to one month for lagers. The finished beer is clarified and lagered.

Brewers typically use the boil time in the wort preparation process to achieve and regulate several desirable outcomes. Among the objectives of the wort boil are to pasteurize the wort, remove, or at least partially remove DMS compounds, and isomerize the bittering resins of the hops. Adequate pasteurization can be achieved in relatively short periods of time at boiling temperatures. However, DMS removal (or at least partial removal by evaporation) and hops isomerization and extraction require longer periods of time at the sustained temperatures of the rolling wort boil. Therefore, the extraction of the isomerized hops resin adds to the longer boiling times of most wort preparation. Longer boiling times means more energy invested by the brewer.

The culinary industry has long sought a beer concentrate for the addition of beer flavor to food. Beer itself contains too much water to be added to many recipes. Therefore, a beer concentrate is desired to impart full and authentic beer flavor to food without the undesired effects of adding unwanted water.

It would, therefore, be desirable to provide a beer, wine, or cider concentrate for purchase by consumers that can be reconstituted by simply adding water, and possibly carbonation. Thus, a method of making an alcohol concentrate solving the aforementioned problems is desired.

SUMMARY OF THE INVENTION

The present invention relates to a method of making an alcohol concentrate. The concentrate is achieved through a natural but modified fermentation process in which a plurality of existing separation technologies are employed at specific points within the process to yield a beer that has a very low water concentration, and can, prior to consumption, be reconstituted with water to yield a beer that is only lacking in carbonation. Carbonation can then be achieved through any number of traditional or novel methods.

One embodiment of the invention is a method for preparing an alcohol concentrate comprising the steps of: fermenting wort, removing alcohol and aromatics from at least a portion of the fermented wort, and reestablishing the fermentation in the distilled wort by adding additional fermentation ingredients and additional yeast as needed. The alcohol and aromatics may be removed in separate or combined streams, or may be removed under cool or normal temperatures. These steps may be repeated as needed to obtain a desired level of concentration of the fermented wort. The wort is further processed by removing water through reverse osmosis, evaporation, spray drying, or a combination of these applications, and recombining the distilled alcohol and/or aromatics with the concentrated fermented wort. The alcohol concentrate may be beer, wine, cider or other fermentable beverages. In another embodiment of the invention, additional flavor ingredients such as, but not limited to, hop oil and isomerized hop extracts may be added to the concentrated fermented wort.

Another embodiment of the invention is a continuous method for producing an alcohol concentrate, comprising the steps of: fermenting the wort until the desired (optimal) rate of fermentation of the wort has been achieved; diverting a volume of the fermented wort for yeast removal by centrifugation or filtration; and removing the alcohol and aromatics by vacuum distillation. The distilled portion of the fermentation is then refortified by addition of concentrated wort, pasteurized, and returned to the active fermentation.

Another embodiment of the present invention is a method for efficiently extracting hops resins, isomerized resins, oils and aromatics and the like from hops. In this embodiment, hops are added to the distilled alcohol and the pressure and temperature are varied for maximal extraction of hops.

These and other features of the present invention will become readily apparent upon further review of the following specification.

DETAILED DESCRIPTION OF THE PREFERRED EMBODIMENTS

The present invention relates to a method of making an alcohol concentrate. The concentrate may be easily carried by hikers, campers, hunters, and the like, and may be reconstituted to form a potable beverage by hydration with water from streams, lakes, or other natural sources. The method will be illustrated by reference to a process for making beer concentrate. The method is similar for a wine concentrate or a cider concentrate. The process for making wine, for example, is similar to the process for making beer, except that wine is made from fruits that naturally contain sugar, whereas beer comes from grain and requires converting the starch in grains to sugar. As used herein, the term "wort solids" refers to the quantity of fruit (in the case of wine) or grain, malt, and hops (in the case of beer), plus any other flavor additives from which the wort is prepared.

There are immeasurable variations of ingredients and flavorings that are utilized by the brewing industry. The following process description therefore does not attempt to encompass all variations of the brewing process that are made possible either through ingredients or known modifications to the brewing process. Furthermore these steps can be employed by all nature of fermented beverages (cider, wine, etc) in order to achieve a concentrate of that specified beverage. In one embodiment of the method, a basic beer ingredient profile consisting of malted barley, hops, water, and brewer's yeast is considered. Moreover, for the purposes of designing a beer concentrate, it is advantageous to utilize concentrated wort (with water already significantly removed). Therefore, all discussion of "wort concentrate" will assume that the wort was prepared through standard procedures dictated by the nature and character of the beer being designed (including: mashing, lautering, sparging, etc.), and then evaporated or spray dried for partial or near total water removal. An example of one such commercially available concentrated wort that satisfies these basic qualities is "Concentrated Brewers Wort" made by Briess Malt and Ingredients Company.

In one embodiment of the present invention, the process is largely divided into three separate phases. The first phase is a "Nested Fermentation" cycle in which beer ingredients are added according to the desired character, flavor, and nature of the end product desired. Nested fermentation as used herein refers to multiple batches of fermentation using the same recycled aqueous solution. In this "Nested fermentation" phase of the process, the beer grows in concentration through an optionally repetitive cycle involving the removal of ethanol and other aromatics that represent a limiting barrier to the extent of fermentation achievable, and thus the final production of alcohol as a result of fermentation. The brewer must determine how many repetitive cycles of nested fermentation to utilize, and subsequently what the desired level of concentration of the fermented wort will be. Each additional round of nested fermentation naturally results in a greater degree of concentration of fermented wort; however each round also costs the brewer additional time, energy, and resources. Additionally, as the fermented wort becomes more concentrated, the brewer will need to compensate for the higher starting gravities of the wort during each subsequent nesting cycle. This is typically managed through strict adherence to wort nutrition and attention to large healthy yeast propagations prior to the start of fermentation. However, both of these criteria add a complexity and cost to the brewing operation. As the starting gravity of the wort continues to increase with each nesting cycle, so too does the time required for fermentation. When the benefits and costs of additional rounds of nested fermentation are considered, the brewer must make a determination as to how many cycles of nested fermentation will be cost effective, time efficient, and practical given the specific nature of the designed beer of interest. In practice, nested ferments with starting gravities of over 1.17 g/ml have been achieved. However, due to the magnitude of compensations required for these non-ideal conditions, these fermentations were considered to be impractical for industrial production purposes. Largely speaking, it is recommended that when the investment of resources allocated to achieve additional levels of concentration through the nested fermentation process equals those required to achieve that same increase in concentration through a selected/specified water removal process (to be described here after), the brewer abandon the nested fermentation process in favor of direct water removal. At this point the brewer has achieved the desired level of concentration of fermented wort through the nested fermentation phase.

The second phase of the process requires water to be extracted and removed from the de-alcoholized beer by reverse osmosis, evaporation, spray drying, or a combination of these processes. Removing water through a reverse osmosis, evaporation, or spray drying processes is well known to one of ordinary skill in the art. The third phase of the process requires the reuniting of previously separated and processed components of the beer process, other than the intentionally removed water. In this phase, the concentrated "bottoms" product is mixed with the alcohol and aromatics that were removed during the nested fermentation cycle, thus combining all components of the fermentation process, except for the water previously removed by reverse osmosis, evaporation, or spray drying. During this last phase of the process additional flavorings can also be added, such as hop oils/extracts, to modify the flavor profile of the beer. A more detailed description of nested fermentation, water removal, and reconstitution of the separated components are given in the description below.

The concentrated or non-concentrated wort is prepared through traditional wort preparation steps or by the addition of concentrated wort, hops, if desired, for anti-microbial effects or early bittering, water, and any required nutritional additives. A yeast slurry is prepared with a proportionately appropriate cell count designed for the volume and specific gravity considerations of the wort. This yeast slurry is propagated in an oxygenated environment that is fortified with minute doses of olive oil, both of which are known to the brewing industry to help support robust and healthy cellular material in yeast. If the volume of the yeast slurry is determined to be greater than the volume desired to be added to the wort, the yeast slurry can be chilled to cause the yeast to flocuate and settle to the bottom of their container. The clarified wort, separated from the yeast cake, can then be decanted, leaving the yeast cake intact. A small amount of oxygenated wort can be added to this yeast cake and mixed while the slurry returns to active temperatures and the yeast resumes active/observable metabolism. This now-concentrated yeast is then pitched to the wort. Although the wort may be aerated during the initial fermentation cycle, subsequent fermentations within the nested fermentation cycle should avoid the aeration of the newly prepared wort. This is due to the potential for adverse oxidative effects of the post-fermentation de-alcoholized beer components.

The beer is preferably fermented for approximately 6-7 days. After it has undergone a diacetyl rest, it is processed for the removal of suspended yeast. This can be accomplished by either centrifugation or filtration. The beer is then processed through vacuum distillation to remove the delicate aromatics, and the alcohol (primarily ethanol). Depending on the degree of concentration of these "top products" the two distillate streams can either be combined and stored for a later addition to the concentrated de-alcoholized beer, or they can be stored separately if it is desired for either of them to undergo additional, separate processing. Additional processing options include, but are not limited to: steeping vegetative hops products in the distilled ethanol under high pressure/temperature in a closed system for bittering and aromatic hops addition, or further distillation of ethanol to increase its degree of concentration.

There are many vacuum distillation systems known to the brewing industry that can function for this separation process. Some employ spinning cones that create a thin film of material that is warmed and exposed to vacuum conditions, while others employ rising/falling film systems that are subjected to vacuum conditions. These systems are used primarily for the production of non-alcoholic, or low-alcohol beer. Regardless of basic design considerations, the essential components and modifications of this equipment must support the near total removal of aromatics and alcohols under low temperature conditions. The equipment may furthermore be modified to reclaim the aromatic distillate and ethanol distillate streams separately, nearly completely, and to a high level of concentration.

Once the alcohol and aromatics have been separated, collected, and stored according to the design and desire of their further processing, additional concentrated wort can be added and blended with the de-alcoholized beer. The de-alcoholized beer will still have residual, isomerized bittering hops compounds present, if initially added, from the first fermentation cycle, and will also have the water that was used during the first fermentation cycle. Some water will have been removed during the vacuum distillation process, and therefore a small amount of water will need to be added to the wort. However, the yeast slurry, potentially concentrated through chilling/decanting as described previously, that is added after pasteurization will increase the total volume of the wort, and should be considered before additional water is added. The concentration achieved through the nested fermentation cycle is derived from the re-utilization of brewing water to effectively layer or "nest" multiple batches of beer within the same recycled volume of aqueous medium.

The wort is then pasteurized by UV exposure, irradiation, or other viable pasteurization methods that do not degrade the matrix of thermally sensitive flavor components that are residuals from the previous round(s) of fermentation. However, if there are hop bittering compounds in the wort, UV exposure should be avoided. Such methods would be readily apparent to one of ordinary skill in the art. The propagated/prepared yeast is then pitched to the wort, and a new round of fermentation is initiated.

Each time a beer undergoes these sequential steps, it will become denser (increasing its specific-gravity) due to the remainder of non-fermentable ingredients and non-distillable (bottoms) products derived from the fermentation process. The steps of the nested fermentation cycle are repeated until the starting gravity of the wort becomes a limiting factor to the efficiency of fermentation (unproductively high starting gravity), or the brewer otherwise determines that the desired level of concentration of fermented wort has been achieved, and is therefore ready to move to the water removal phase of the concentration process.

During the beer's final nested fermentation cycle, the beer is transferred to a secondary fermenter for an additional period of time (approximately 5-7 days) immediately after completion of the primary fermentation and diacetyl rest. This allows for clarification and more complete fermentation of the beer, which is referred to as full attenuation.

It is important to note that the nested fermentation cycle is not essential to creating a beer concentrate. This embodiment of the invention makes it possible to take beer from its very first pass through the vacuum distillation process and immediately move the de-alcoholized product down line for water removal (reverse osmosis, evaporation, or spray drying). However, the effect of the nested fermentation loop is that, by re-using the same volume of water for multiple fermentation cycles, the brewer invests very little energy to the system to gain significant yields in concentration. The energy demands of removing the relatively small quantity of alcohol and aromatics through vacuum distillation are significantly less than the energy demands of water removal (larger volume, and lower vapor pressure) under vacuum conditions. Furthermore, several acceptable pasteurization methods exist that allow the brewer to loop the de-alcoholized and refortified beer back through additional fermentation cycles without the need of bringing the product to higher temperatures, as is done in traditional wort preparation and heat pasteurization processes.

Table I illustrates the degree of nesting with the associated degree of concentration achieved through the nesting phase of the concentration process. A first-degree nested beer is one that has undergone only one round of fermentation, and has then passed through the vacuum distillation phase, thus offering no gains in concentration.

TABLE I

Degree of Nesting

| Degree Nested | Starting Gravity | Ending Gravity | Beer concentrate: Rehydrated beer (by volume) |
|---|---|---|---|
| 1 | 1.05 | 1.012 | 1:1 |
| 2 | 1.062 | 1.024 | 1:2 |
| 3 | 1.074 | 1.036 | 1:3 |
| 4 | 1.085 | 1.047 | 1:4 |

The beer industry has long been aware of the benefits to brewing beer concentrates. Many large brewing companies utilize these advantages to reduce transportation costs of large shipments. It is not uncommon for large brewers to craft their beer with additional ingredients in order to yield a stronger, more concentrated, product. This more concentrated product can then be shipped, and upon reaching the point of bottling or distribution, water and carbonation are added so that the end product is reflective of the qualities desired in the designed beer.

These basic procedures can be incorporated into the nested fermentation cycle to produce even greater concentrations in shorter periods of time. For example, by adding 50% more concentrated wort to the start of a fermentation cycle; the resulting beer will yield 50% more alcohol, aromatics, and other characteristic beer flavor components. The brewer must be careful not to over fortify the wort with too much additional fermentable ingredient. To do so would create the obvious difficulty of a high gravity environment coupled with the potential for unachievable levels of alcohol (largely dictated by the strain of yeast being used), which would thereby render the beer under-attenuated through an unattainable fermentation demand. Table II illustrates these findings and associated gains in the level of concentration of the product when additional ingredients are added. In this profile, even a first-degree nested beer yields a degree of concentration, relative to the increased percentage of fermentable ingredients.

TABLE II

Effect of Starting Gravity

| Degree Nested | Starting Gravity (g/ml) | Ending Gravity (g/ml) | Beer concentrate: Rehydrated beer (by volume) |
|---|---|---|---|
| 1 | 1.075 | 1.018 | 1:1.5 |
| 2 | 1.093 | 1.036 | 1:3 |
| 3 | 1.111 | 1.054 | 1:4.5 |
| 4 | 1.129 | 1.071 | 1:6 |

Regardless of how many nesting fermentation cycles the beer undergoes, or what level of concentration is achieved as a result of the nested fermentation cycles, the de-alcoholized beer still contains considerable weight and volume of water. This water must be removed to further increase the level of concentration of the product.

In the second phase of this embodiment of the invention, the de-alcoholized beer, either partially concentrated through the nested fermentation cycle or not, is drawn through an evaporation or spray drying process, thereby removing either significant or nearly total quantities of water. Both processes yield benefits and disadvantages. Spray drying is advantageous due to the almost complete removal of water from the product, but has been perceived to offer slight flavoring disadvantages, partly due to the operating temperatures of most spray drying equipment. Also, spray drying typically uses substantially more energy than evaporation. Low temperature evaporation conducted under vacuum helps protect delicate flavors of the product, but does not remove as much water as the spray drying process. It is therefore envisioned that these two separation techniques will be evaluated by the brewer with the desired qualities of the end product and their separate limitations in mind. In addition or alternatively to the aforementioned water removal options of evaporation and spray drying, reverse osmoses offers the brewer an energy saving option for the removal of notable quantities of water. Although reverse osmoses has not reviled itself to be as effective as evaporation or spray drying in its ability to remove water from the fermented wort concentrate, it does offer some advantages due to its relatively low capital and operational costs. Additionally, by integrating a reverse osmosis water removal process prior to a more substantial water removal processes (as in evaporation or spray drying), the brewer can reduce the energy demands of the water removal phase of the process, while still achieving a high degree of water removal. The utilization of reverse osmosis systems in the brewing industry is readily known to one who is skilled in the art. In particular, reverse osmoses is a process sometimes used in the production of non alcoholic or low alcohol beers.

In the third phase of this embodiment of the invention, the remaining concentrate, with water removed, must be reunited with the alcohol and aromatics that were removed during the previous nested fermentation cycles. The concentrated/de-alcoholized beer is blended with the distilled/collected alcohol (primarily ethanol) and distilled/collected aromatics recovered through the vacuum distillation steps performed during the nesting fermentation phase of the process. Additional flavor components can also be added (such as hop oil, or isomerized hops extract) to adjust the final flavor profile of the beer.

This concentrated product now represents the naturally fermented, desirable beer flavoring components with the majority of water removed from the system. The product is ready for packaging and transportation in its efficiently concentrated state. To prepare the beer for consumption, an appropriately measured volume of water is added to the beer concentrate based upon the final degree of concentration of the product. The beer is then carbonated appropriately to support the desired flavor profile of the designed beer. Alternatively, the water can be carbonated prior to blending with the beer concentrate, as is typical of soda fountain dispensers.

Another embodiment of the invention provides for continuous fermentation. The nested fermentation process described previously outlines a batch process. It is also desired to have available a continuous operation that would reduce/remove the lag time typically associated with the first 24-48 hours of fermentation. The following modifications to the nested fermentation process allow the brewer to utilize a continuous process in order to achieve an alcohol concentrate. The continuous operation is basically parallel in format to the batch process, except that fermentation remains active while only a portion of the fermentation is removed for yeast removal, vacuum distillation, refortification of ingredients, pasteurization, and return to the fermenter.

In the continuous method, a batch of green beer is allowed to proceed until a desired rate of fermentation is reached. "Green beer," as used herein, refers to a fermented but unfinished beer. In this application the desired rate of fermentation is understood to be the peak rate of observable anaerobic yeast metabolism for the current/dedicated volume of ferment. A brewer can observe and keep record of a beers rate of fermentation through a myriad of techniques known to the industry. Three common methods involve frequent gravity (density) measurements being taken by use of a hydrometer, use of a refractometer to track the concentration of available sugars in the ferment, or by the observance of $CO_2$ (which is a product of fermentation) production during the fermentation. By comparing subsequent measurements over closely recorded periods of time, these methods provides the brewer with a means of determining the rate of metabolic activity of the yeast, and can thereby be used in determining when the peak, desired rate of fermentation has been achieved.

When the desired rate of fermentation has been observed, a volume of green beer is then diverted for yeast removal by centrifugation or filtration. These yeast removal techniques are known and standard in the art. Next, ethanol and aromatics are removed from the green beer through vacuum distillation, as described previously. The de-alcoholized green beer is then refortified with concentrated wort, pasteurized, and returned to the fermenter where the remainder of the green beer is still actively undergoing fermentation. Additional yeast may be pitched to replace the yeast that was removed during centrifugation/filtration. Excessive build-up of dead yeast material should be continuously removed from the bottom of the fermenter. By regulating the frequency and volume of the green beer that is removed for processing, the brewer can maximize and sustain the rate of fermentation to reduce residency times of the fermentation equipment, thereby increasing efficiency.

Once the green beer within the fermenter has reached the desired level of concentration, or the specific-gravity has become too great to efficiently support additional fermentation, it is held in the primary fermenter long enough as to support a sufficient diacetyl rest. It is then transferred to a secondary fermenter, where it is allowed to clarify and fully attenuate. Upon completion of the secondary fermentation, the entire volume is transferred through the yeast removal and de-alcoholization (vacuum distillation) process. The concentrate can then be processed through the water removal steps described previously.

By processing the green beer that is removed for de-alcoholization in a closed sanitary (and sanitized) system, the brewer can greatly minimize the need for pasteurization of the de-alcoholized green beer prior to returning it to the fermenter. In this case the concentrated wort that is used to refortify the de-alcoholized green beer can be pasteurized separately. This concentrated wort is less susceptible to thermal degradation than the green beer itself, and may alternatively be added directly to the fermenter as the processed de-alcoholized green beer is returned. Furthermore, by maintaining an ongoing fermentation with a high healthy yeast cell count, the brewer minimizes the likelihood of microbial contaminations taking root within the fermenting green beer.

By modifying the nested fermentation cycle to operate continuously at, or near, peak fermentation, the brewer minimizes the residence time of the green beer, thereby reducing the overall time required to complete this phase of the concentration process.

Either of the aforementioned methods (batch or nested fermentation) can be modified for efficient extraction of hops oils, aromatics, resins, bitters and other desirable components from hops. Hops are one of the dominant flavoring ingredients in beer. Many varieties exist, and are selected by the brewer based upon a number of criteria. Some are preferred for their bittering qualities, while others possess desirable aromatic benefits. In addition to adding flavor and aroma to the beer, hops are also known to posses anti-microbial benefits, thus helping prevent the finished beer from becoming infected with adverse biological agents. Hops is traditionally considered one of the most underutilized ingredients in beer, meaning that only a small percentage of the desired qualities of the hops plant are extracted through the traditional brewing process. More time, higher heat, and better solvents all yield gains in hops extraction efficiency. Unfortunately traditional brewers are limited to a large extent by the disadvantages of the traditional brewing process, where, other than time, these variables are largely static. The upper temperature of hops extraction for most brewing operations is the boiling temperature of water, with compensation for elevation. The solvent used for the hops extraction is simply the water of the wort. Time is the only variable that is readily manipulated to create variations in hops extractions, and is used by brewers to customize a beer's hops profile.

In contrast to these traditional limitations, the batch or continuous methods can be modified to allow hops to be extracted through a novel and efficient mechanism whereby the hops (whole leaf, pellet, or other vegetative form) are added to the entire amount of collected (distilled) alcohol. Thus, the brewer is able to use the very same ethanol that was produced during fermentation as the solvent for the extraction of hops. Ethanol is far superior for this purpose than water, and by creating a closed system that is held under pressure, the brewer can increase the temperature of the system beyond the boiling temperature water to allow an even greater yield of desired hops components. By adjusting the pressure of the closed system, the brewer can manipulate both time and temperature of the hops extraction process. It is recommended that the pressure of the system be selected and maintained based upon the desire to limit the amount of ethanol and aromatic compounds that contribute the vapor phase of the closed system during the extraction process at the targeted extraction temperature. It is further recommended that nitrogen be used to establish pressure within the closed system prior to heating of the system. Nitrogen is preferred for its inert qualities. The duration of the extraction may vary, depending on the temperature and pressure used. Furthermore, the closed system allows the brewer to capture the delicate hops oils (aroma compounds), that are usually lost when hops are boiled for long periods of time as in an open wort boil. At the end of the extraction process the hops and ethanol mixture is cooled, the pressure is slowly relieved, and the vegetative hops material can be separated from the extraction solvent. By chilling the liquid prior to relieving the pressure, the brewer assures that minimal aromatics are lost as vapor. These advancements and options in hops extraction collectively represent an alternative higher degree of efficiency of hops utilization to the brewer, thereby reducing the quantity of hops needed to achieve the desired hops character in the designed beer. With hops being a large and volatile cost within the list of beer ingredients, this efficiency represents a significant cost savings to the brewing process.

It is to be understood that the present invention is not limited to the embodiments described above, but encompasses any and all embodiments within the scope of the following claims.

What is claimed is:

1. A method for making a beverage, the method comprising:
   performing a first fermentation step using a first set of fermentation ingredients to create a first fermented solution;
   removing a first collection of alcohol and aromatics from the first fermented solution to create a first de-alcoholized solution;
   adding a second set of fermentation ingredients to the first de-alcoholized solution;
   performing a second fermentation step using the second set of fermentation ingredients in the first de-alcoholized solution to create a second fermented solution;
   creating a beverage, wherein creating the beverage comprises using the second fermented solution and at least a portion of a previous collection of alcohol and aromatics.

2. The method of claim 1, wherein creating the beverage comprises creating a non-alcoholic beverage, wherein creating the non-alcoholic beverage comprises:
   removing a second collection of alcohol and aromatics from the second fermented solution to create a second de-alcoholized solution; and
   creating the non-alcoholic beverage by combining the second de-alcoholized solution with at least a portion of the first and/or second collection of aromatics.

3. The method of claim 1, wherein creating the beverage comprises creating an alcoholic beverage, wherein creating the alcoholic beverage comprises:
   combining the second fermented solution with at least a portion of the first collection of alcohol and aromatics.

4. The method of claim 1, wherein creating the beverage comprises creating an alcoholic beverage, wherein creating the alcoholic beverage comprises:
   removing a second collection of alcohol and aromatics from the first fermented solution to create a second de-alcoholized solution;
   adding a third set of fermentation ingredients to the second de-alcoholized solution;
   performing a third fermentation step using the second set of fermentation ingredients in the first de-alcoholized product to create a second fermented solution; and
   creating the alcoholic beverage by combining the second fermented solution with at least a portion of the first and/or second collection of alcohol and aromatics.

5. The method of claim 1, wherein the first set of fermentation ingredients includes a first wort.

6. The method of claim 5, wherein the second set of fermentation ingredients includes a second wort.

7. The method of claim 1, wherein removing the first collection of alcohol and aromatics comprises removing the alcohol and the aromatics in separate streams.

8. The method of claim 1, wherein creating the beverage comprises creating a beer.

9. The method of claim 1, wherein the previous collection of alcohol and aromatics comprises the first collection of alcohol and aromatics.

10. The method of claim 1, wherein creating the beverage comprises creating a beverage concentrate, wherein creating the beverage concentrate comprises:
    removing water from the second fermented solution to create a concentrated fermented solution; and
    combining the concentrated solution with at least a portion of a previous collection of alcohol and aromatics to create the beverage concentrate.

11. A method for making a beverage, the method comprising:
    fermenting a first set of fermentation ingredients in a solution in a fermentation tank;
    creating a final fermented solution through nested fermentation, the nested fermentation comprising:
    (a) removing alcohol and aromatics from the solution in the fermentation tank;
    (b) adding additional fermentation ingredients to the solution in the fermentation tank; and
    (c) fermenting the additional fermentation ingredients in the solution; and
    (d) performing steps (a), (b), and (c) one or more times to obtain the final fermented solution;
    creating a concentrated solution by removing water from the final fermented solution; and
    forming a concentrated beverage by combining the concentrated solution with at least a portion of the alcohol and aromatics removed in step (a).

12. The method of claim 11, wherein the concentrated beverage is a concentrated beer.

13. The method of claim 11, wherein the concentrated beverage is a concentrated wine.

14. The method of claim 11, wherein removing alcohol and aromatics comprises removing the alcohol and the aromatics in separate streams.

15. The method of claim 11, wherein the first set of fermentation ingredients includes aerated wort.

16. The method of claim 11, wherein removing water from the final fermented solution is accomplished using a method selected from the group consisting of reverse osmosis, evaporation, and spray drying.

17. The method of claim 11, further comprising adding flavor components to the concentrated solution.

18. The method of claim 11, further comprising extracting hops using the alcohol and aromatics removed in step (a).

* * * * *